United States Patent
Mont-Reynaud et al.

(10) Patent No.: US 12,417,354 B2
(45) Date of Patent: *Sep. 16, 2025

(54) USING SEMANTIC GRAMMAR EXTENSIBILITY FOR COLLECTIVE ARTIFICIAL INTELLIGENCE

(71) Applicant: SOUNDHOUND AI IP, LLC, Santa Clara, CA (US)

(72) Inventors: Bernard Mont-Reynaud, Sunnyvale, CA (US); Christopher S. Wilson, Sunnyvale, CA (US); Keyvan Mohajer, Los Gatos, CA (US)

(73) Assignee: SOUNDHOUND AI IP, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,593

(22) Filed: Oct. 18, 2023

(65) Prior Publication Data

US 2024/0046044 A1     Feb. 8, 2024

Related U.S. Application Data

(63) Continuation of application No. 17/377,375, filed on Jul. 16, 2021, now Pat. No. 11,829,724, which is a continuation of application No. 16/505,185, filed on Jul. 8, 2019, now Pat. No. 11,100,291, which is a continuation of application No. 15/660,867, filed on Jul. 26, 2017, now abandoned, which is a continuation of application No. 15/069,907, filed on Mar. 14, 2016, now abandoned.

(60) Provisional application No. 62/133,290, filed on Mar. 13, 2015.

(51) Int. Cl.
*G06F 40/30* (2020.01)
*G06F 8/20* (2018.01)

(52) U.S. Cl.
CPC ............... *G06F 40/30* (2020.01); *G06F 8/24* (2013.01)

(58) Field of Classification Search
CPC ................................ G06F 40/30; G06F 8/24
See application file for complete search history.

(56) References Cited

U.S. PATENT DOCUMENTS

| | | |
|---|---|---|
| 5,583,762 A | 12/1996 | Shafer |
| 6,195,792 B1 | 2/2001 | Turnbull et al. |
| 6,745,161 B1 | 6/2004 | Arnold et al. |
| 7,289,950 B2 | 10/2007 | Bellegarda et al. |
| 7,890,328 B1 | 2/2011 | Blanchard et al. |
| 8,352,245 B1 | 1/2013 | Lloyd |

(Continued)

OTHER PUBLICATIONS

Dahl, D. A. "Natural Language Semantics Markup Language for the Speech Interface Framework." W3C Working Draft WD-nl-soec-20001120 (2000).

(Continued)

*Primary Examiner* — Brian L Albertalli
(74) *Attorney, Agent, or Firm* — Pearl Cohen Zedek Latzer Baratz LLP

(57) ABSTRACT

Support for natural language expressions is provided by the use of semantic grammars that describe the structure of expressions in that grammar and that construct the meaning of a corresponding natural language expression. A semantic grammar extension mechanism is provided, which allows one semantic grammar to be used in the place of another semantic grammar. This enriches the expressivity of semantic grammars in a simple, natural, and decoupled manner.

18 Claims, 8 Drawing Sheets

(56) References Cited

U.S. PATENT DOCUMENTS

| | | |
|---|---|---|
| 2002/0123881 A1 | 9/2002 | Schmid et al. |
| 2003/0009335 A1 | 1/2003 | Schalkwyk et al. |
| 2004/0083092 A1 | 4/2004 | Valles |
| 2006/0074671 A1 | 4/2006 | Farmaner et al. |
| 2006/0089835 A1 | 4/2006 | Bisson et al. |
| 2006/0282266 A1 | 12/2006 | Lopez-Barquilla et al. |
| 2006/0293894 A1 | 12/2006 | Peyroux |
| 2007/0055492 A1 | 3/2007 | Wang et al. |
| 2009/0119095 A1 | 5/2009 | Beggelman et al. |
| 2009/0319239 A1 | 12/2009 | Arnold et al. |
| 2010/0217604 A1 | 8/2010 | Baldwin et al. |
| 2011/0137915 A1 | 6/2011 | Bahl et al. |
| 2013/0204610 A1 | 8/2013 | Wu |
| 2014/0114649 A1 | 4/2014 | Zuev et al. |
| 2014/0236571 A1 | 8/2014 | Quirk et al. |
| 2014/0244254 A1 | 8/2014 | Ju et al. |
| 2015/0073798 A1 | 3/2015 | Karov et al. |
| 2015/0100943 A1 | 4/2015 | Gabel et al. |
| 2015/0279360 A1 | 10/2015 | Mengibar et al. |
| 2015/0348547 A1 | 12/2015 | Paulik et al. |
| 2016/0004766 A1 | 1/2016 | Danielyan et al. |
| 2016/0124936 A1 | 5/2016 | Wang et al. |

OTHER PUBLICATIONS

Debusmann, R. et al. "Extensible Dependency Grammar: A New Methodology." Proceedings of the COLING 2004 Workshop on Recent Advances in Dependency Grammar, Jan. 2004, pp. 1-7.

Gavalda, M. et al. "Growing Semantic Grammars." Proceedings of the 36th Annual Meeting of the Association for Computational Linguistics and 17th International Conference on Computational Linguistics, vol. 1, Aug. 1998, pp. 451-456.

Gosling, J. et al. "The Java™ Language Environment: A White Paper." Sun Microsystems, Inc., May 1996, pp. 1-98.

Hunt, A. et al. "Speech recognition grammar specification version 1.0." W3C Recommendation, Mar. 2004.

Meyers, A. "Vox: an extensible natural language processor." Proceedings of the 9th international joint conference on Artificial intelligence—vol. 2. Morgan Kaufmann Publishers Inc., 1985.

Stolcke, A. "SRILM—An Extensible Language Modeling Toolkit." Proceedings of the $7^{th}$ International Conference on Spoken Language Processing, 2002, pp. 1-4.

Sygal, Y. et al. "Towards Modular Development of Typed Unification Grammars." Computational Linguistics 37.1 (2011): 29-74.

United States Office Action, U.S. Appl. No. 15/660,867, filed Feb. 8, 2019, 7 pages.

United States Office Action, U.S. Appl. No. 15/660,867, filed Jul. 9, 2018, 7 pages.

Van Tichelen, L. et al. "Semantic interpretation for speech recognition." VV3C Last Call Working Draft 8 (2004).

Van Wyk, E. et al. "Silver: an extensible attribute grammar system." Electronic Notes in Theoretical Computer Science 203.2 (2008): 103-116.

Wilesnky, R. et al. "PHRAN—A Knowledge-Based Natural Language Understander." Proceedings of the $18^{th}$ Annual Meeting on Associated for Computational Linguistics, Jun. 1980, pp. 117-121.

United States Office Action, U.S. Appl. No. 15/069,907, filed Nov. 17, 2016, 25 pages.

United States Office Action, U.S. Appl. No. 17/377,375, filed Feb. 28, 2023, six pages.

USING SEMANTIC GRAMMAR EXTENSIBILITY FOR COLLECTIVE ARTIFICIAL INTELLIGENCE

RELATED APPLICATIONS

This application is a continuation of U.S. patent application Ser. No. 17/377,375, filed Jul. 16, 2021, which is a continuation of U.S. patent application Ser. No. 16/505,185, filed Jul. 8, 2019, which is a continuation of U.S. patent application Publication Ser. No. 15/660,867, filed Jul. 26, 2017, which is a continuation of U.S. patent application Ser. No. 15/069,907, filed Monday, Mar. 14, 2016, which in turns claims the benefit of Provisional Application No. 62/133,290, filed on Mar. 13, 2015, all of which are incorporated herein by reference.

TECHNICAL FIELD

The disclosed embodiments relate generally to computer-implemented methods for extending programming language constructs or other specific attributes in natural language processing.

BACKGROUND

When developing software applications, a software developer typically uses code developed by others. Specifically, in the field of natural language processing, software applications use particular programming code to interpret and respond to complex linguistic inputs, such as user queries or other expressions in a natural language (whether specified as text or as speech).

Given the complexity of human language and the many possible ways of expressing the concept, it is a daunting task to author code that can begin to handle such complexity. For example, even if a particular software developer succeeds in developing code that can interpret a natural language expression expressing a date as a literal value (e.g., a month, day, and year), it would take considerable additional effort for the developer to further handle the concept of dates expressed as a historical condition (e.g., the day that particular event took place). Thus, even if a developer wrote code to code could interpret an expression such as "How long ago was Nov. 9, 1989?" such code would be unlikely to be able to interpret an alternative formulation of the question, such as "How long ago was the day that the Berlin wall fell?" Accordingly, the development of (for example) relatively comprehensive virtual assistant software capable of interpreting the universe of possible questions that a user might pose is extremely difficult, particularly for any single author or organization.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
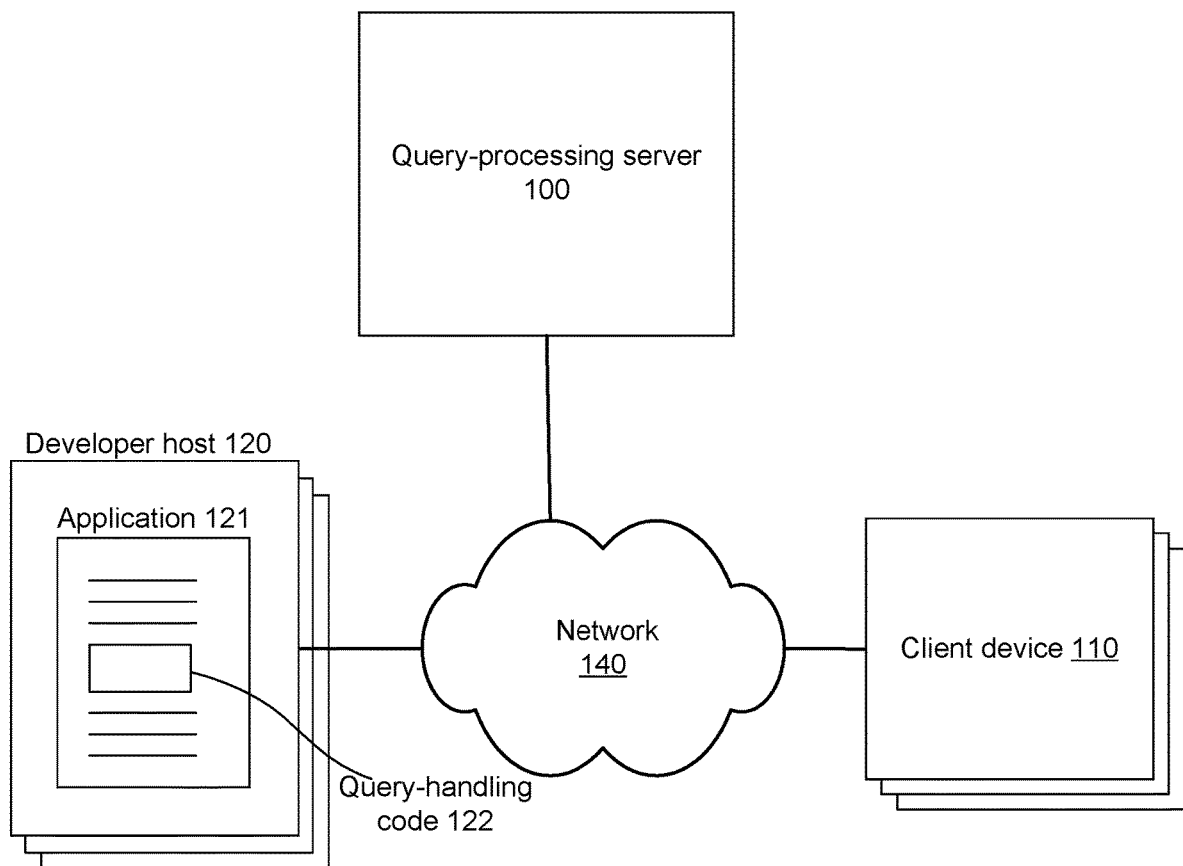
FIG. 1 shows a system environment in which query processing takes place, according to one embodiment.

FIG. 1 shows a system environment in which query processing takes place, according to one embodiment. Users of client devices 110 submit natural language queries to software applications 121 hosted on developer host systems 120, by way of a user interface that uses a microphone (for spoken queries), a keyboard (for written queries), or alternative ways of entering natural language input. The applications 121 delegate the analysis of the natural language queries to a query-processing server 100.

More specifically, the developer host systems 120 (e.g., web/application servers) provide the runtime environment for applications 121 (e.g., virtual assistants) developed by developers. A host system 120 is a computer system including one or more web servers, application servers, databases, and related computer hardware and software. The developers may administer the developer host systems 120, or the developer hosts may be administered by third parties.

Client devices 110 submit natural language queries from users for information to the applications 121. The various applications 121 can support natural language queries in any domain that the developers intend to support, each domain representing a particular area of information. For example, one developer can provide an application 121 supporting queries in the domain of geography/places, e.g., where the application 121 is configured to process natural language questions about populations and sizes of countries. As another example, another developer can provide an application 121 configured to process natural language queries in the domain of entertainment, e.g., responding to questions about particular movies, music, etc. As yet another example, another developer can provide an application configured to process natural language queries in the domain of geography, providing answers to questions regarding population, area, resources, or the like. Of course, a particular application 121 is not limited to a single domain, but rather may support queries in any number of domains. For example, a virtual assistant application may support queries in a large number of distinct domains, such as messaging, calendaring, task scheduling, and communications.

Since the developers of the applications 121 typically lack the considerable expertise required to properly configure an application 121 to process natural language queries, applications 121 are configured to make calls 122 (e.g., web service calls) that, in one embodiment, delegate the analysis of the natural language queries to the query-processing server 100 by passing the text of the natural language queries to the query processing server. The query-processing server 100 then returns the results of the query interpretation to the application 121. For example, the user of the client device 110 might specify the query "What was the market cap of Apple in 1989 in Japanese yen?", which the application 121 would receive, transmitting the query to the query-processing server 100; the query-processing server would then transmit the correct response to the application 121, which could present it to the client device 110.

The query-processing server 100, the developer host system 120, and the systems of the client devices 110 may be implemented with various forms of hardware in different embodiments. Developer host systems 120 and client devices 110 communicate with the query-processing server 100 through a network 140. The network may be any suitable communications network for data transmission. In one embodiment, the network 140 is the Internet and uses standard communications technologies and/or protocols.

Although the processing of the queries is described above, and throughout the below, as being implemented on the query-processing server 100, it is appreciated that the logic for processing queries can be located elsewhere in other embodiments. For example, in one embodiment the query processing logic is implemented as a runtime library located directly on the developer host systems 120. In all embodiments, the query processing logic is a set of computer implemented algorithms, as further described herein. Finally, as will be apparent from the following discussion, the algorithms and processes described herein require implementation on a computer system, and cannot be performed by humans using mental steps in any useful embodiment.

Figure 2:
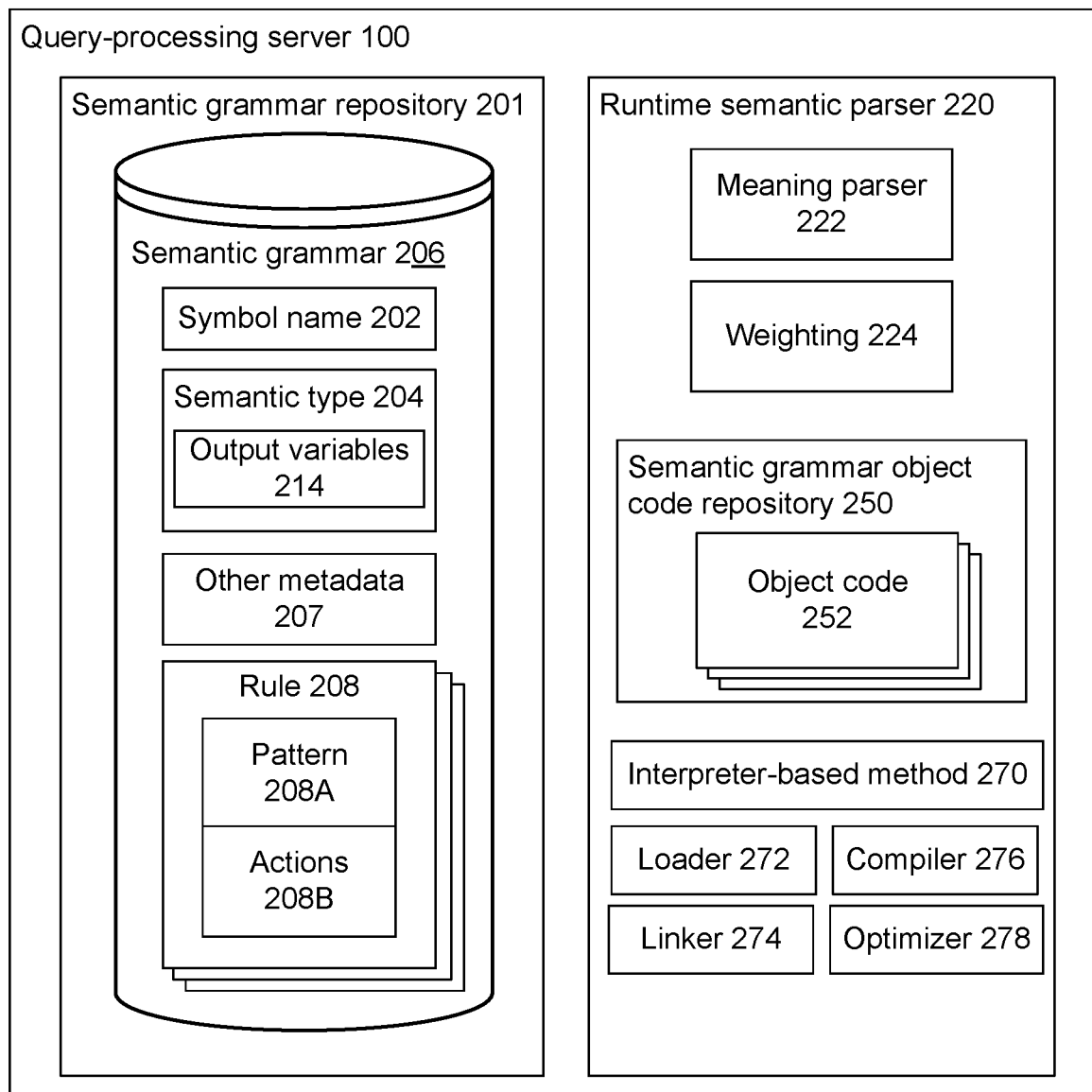
FIG. 2 illustrates in more detail the components of the query-processing server, according to one embodiment.

FIG. 2 illustrates in more detail the components of the query-processing server 100, according to one embodiment. As can be appreciated by one of skill in the art, the configuration of the logic and data on the query processing server 100 are not part of the native configuration of a generic computer, and results in a particular, non-generic computer system that is specifically structured to perform the functions described herein.

An embodiment of the present disclosure uses an approach to language description whose concepts and terminology are closely related to context-free grammars (CFG's). Context-free grammars are known in the art; they are briefly reviewed in this disclosure. A context-free grammar comprises: "terminal symbols," that are language constants, such as dictionary words in a natural language; "non-terminal symbols," that are named variables (such as <SUBJECT> and <VERB>) that stand for sets of expressions in the target language; and a set of "grammar rules," called "rules" for short, that specify each non-terminal in terms of other symbols. Specifically, a non-terminal symbol S is described using one or more rules, and each rule specifies a sequence of (terminal or a non-terminal) symbols, S1 S2 . . . SN. The symbol S is called the left hand side (LHS) of the rule, and the sequence S1 S2 . . . SN is called its right hand side (RHS). A grammar G may be used to generate (or "derive") sequences of words; a generated sequence of words is a "sentence" in the language generated by grammar G. The same grammar may be used to "parse" sequences of words in the language (i.e., to "recognize" valid sentences of G).

Richer notations are available to express the RHS of rules, using a third alphabet of "meta-symbols" to represent grouping (meta parentheses), alternation (E|F), iteration zero or more times (E*) or one or more times (E+), optional expressions ([E]) and more; the specific choice of notation is immaterial but the meta symbols just listed will be used in this disclosure. The alternation meta-symbol can be used (if desired) to regroup all the rules for a non-terminal symbol S into a single rule.

The structure (or "syntax") of a sentence is conveyed by a "parse tree" according to the grammar. But a parse tree does not express the "meaning" or "interpretation" of the sentence. In this disclosure, the "interpretation" of a sentence is a concrete data structure that conveys the computed hypothetical meaning of the sentence. Interpreting a sequence of words according to a grammar G is a process that includes verifying that the word sequence is a sentence according to grammar G, (meaning that the word sequence is syntactically and semantically well-formed) and constructing a meaning data structure for the sentence. In one embodiment, a syntactic pass is first carried out by a parser, followed by a semantic pass carried out by an interpreter. In another embodiment, syntactic and semantic constraints are used alternatively during successive steps of an integrated parser-interpreter. In yet another embodiment, the integrated parser-interpreter also has a purely semantic post-pass that helps resolve some of the unfinished tasks. These different embodiments are all instances of a parser-interpreter module, a.k.a. "semantic parser." Also note that the word "sentence" is used above in the technical string of a string generated by a grammar, hence it applies equally to entire queries or to smaller parts of queries specified by a grammar. For example, "march thirteen two thousand and fifteen" is a "sentence" according to a reasonable grammar for Date expressions.

An approach of "syntax-driven semantics" is to "augment" every grammar rule by associating with it a "semantic augment," which is a function specific to the rule, that constructs the "meaning" of a symbol A from the meanings of its component symbols S1 S2 . . . SN. The process is known as grammar augmentation, and the term "semantic grammar" is used as a synonym for an augmented grammar. In a convenient shift in terminology from formal language theory, every non-terminal symbol A will be called a "grammar." As a result, a "grammar" (in the language theory sense, used above) is a set of grammars (in the new terminology) and for the augmented grammar case, the former "semantic grammar" becomes a set of semantic rules. Beyond general definitions, there is not consensus in the field as to what qualifies as a semantic rule.

The query-processing server 100 includes a semantic grammar repository 201 that contains a set of semantic grammars 206. A semantic grammar 206, via a combination of computer coded data and operations, programmatically defines a set of natural language expressions (hereinafter "expressions") that it is able to interpret, such as expressions describing a desired movie, a desired fact about a geographic location, or the like. When the sequence of symbols that defines a pattern 208A for a first semantic rule 208 includes a second semantic grammar as an element, the first semantic grammar is said to "invoke" the second semantic grammar. The expressive complexity of a domain may be captured using multiple semantic grammars, where invocation of one grammar by another is used to build more complex expressions from simpler ones; in some embodiments, this includes recursive dependencies. Taking an example from the arithmetic domain, a semantic grammar 206 named ARITHMETIC_QUERY( ) could have two rules 208, one whose pattern 208A invokes a semantic grammar ARITHMETIC_COMMAND( ) to cover imperative forms (such as "add two and seven" or "raise two plus seven to the power five") and another whose pattern 208A invokes a semantic grammar ARITHMETIC_EXPRESSION( ) to cover verbless expressions such as "two plus seven" or "one more than the square root of nine."

Both semantic grammars ARITHMETIC_COMMAND( ) and ARITHMETIC_EXPRESSION( ) are further expanded by invoking additional grammars to support the variety of expression expected in the handling of natural language arithmetic queries. Clearly, arithmetic expressions can be recursive, i.e., able to invoke one another, directly or indirectly; for example, in the expression "one more than the square root of nine," the sub-expression "the square root of nine" is itself an expression. For similar reasons, the grammar ARITHMETIC_COMMAND( ) for arithmetic commands must somehow invoke the grammar ARITHMETIC_EXPRESSION( ): in the command "raise two plus seven to the power five," the expression "two plus seven" is an arithmetic expression, not a command. The single semantic grammar ARITHMETIC_QUERY( ) serves as the top-level semantic grammar for the arithmetic domain's natural language queries. It is typical that a single semantic grammar be used as a top-level grammar for a domain.

The entity responsible for the query-processing server 100 is likely to supply a large initial set of semantic grammars 206, and to make some of them extensible. A number of distinct developers may then submit additional semantic grammars 206 for applications 121, or for domains or sub-domain libraries that are modular components of applications.

A semantic grammar 206 in the semantic grammar repository 201 has a name 202, a semantic type 204, and other associated metadata 207, an open-ended set of properties that may include an author, a description, a date of submission, and many others, a few of which are used in this disclosure. The semantic type is discussed below. A semantic grammar 206 is also associated with one or more semantic grammar rules 208, which are formally defined in a programming language, or in some other formal notation. In an embodiment, a grammar rule 208 (or "rule" for short) has two parts. The first part is a grammar pattern 208A (called the rule's "pattern" for short) that describes the natural language expressions that the rule 208 is able to parse. Although the use of semantic augments change bring some changes, the key aspect of context-free grammars is preserved, and part of the pattern will be expressed in terms of other semantic grammars and terminal symbols. Details are given later for an exemplary embodiment. The second part of a rule's description is a set of programming actions 208B that describe how to construct the interpretation of a successfully parsed expression; typical kind of action is to assign a value to one of the output variables 214. But actions are otherwise unrestricted, and may involve arbitrary computations. Actions 208B also include the checking of semantic constraints. The set of meaningful output variables 214 is defined by the semantic type 204 of the semantic grammar 206. In a typical embodiment, variables not assigned by an action 208B will be set to a default value specified by the semantic type 204, or failing that, to the default value for the type of the variable in the programming language.

In some embodiments, a semantic grammar 206 is permitted to be empty—that is, to have an empty set of rules, lacking an associated rule specifying expressions that the semantic grammar can interpret; such a semantic grammar generates an empty language. This allows a semantic grammar 206 to define a semantic type 204 (typically a list of output variables 214 and their types) and to serve as a placeholder within the patterns 208A of other semantic grammars, analogous to the way in which an interface of an object-oriented procedural programming language defines form but not functionality. Thus, other developers are enabled to (1) define semantic grammars that invoke the placeholder semantic grammar within their patterns, and/or (2) to extend the placeholder semantic grammar in order to give it (and thus any semantic grammar that invokes it) a concrete, interpretable definition. In one embodiment, the combined effect of all extensions from developers is felt by all rules that invoke the placeholder. An alternative way to understand the role of this type of definition is that the semantic type 204 acts as a shared abstraction that all extending grammars may contribute to. In yet other terms, the shared type may be treated as a class in an ontology.

A semantic grammar 206 is said to interpret a natural language expression E if E can be successfully interpreted using at least one semantic rule 208 associated with semantic grammar 206. For this, expression E must be interpreted according to the pattern 208A of the semantic rule 208 (this involves the recursive use of this definition for every semantic grammar 206 invoked in pattern 208A; this notion is familiar enough to need no further explanation) and the semantic constraints (if any) from associated action 208B are all satisfied. The interpretation of expression E is defined by the set of output variables 214 of the grammar rule 208. Note well that all semantic rules 208 for a given semantic grammar 206 must have the same set of output variables 214—or a compatible set of output variables. In effect, the set of output variables is truly defined at the level of semantic grammar 206.

Examples of relevant natural language expressions include those that convey places (e.g., "South America", "the continent where Brazil is found") and their attributes ("population", ("area", "the inflation-adjusted GDP"), units ("square miles", "dollars", "kilograms"), and dates or date ranges ("in 1991", "in the nineties," "yesterday," or "last week") and the like. The output variables yield corresponding interpretations as meaning data structures. Examples are: a Place entity from a table or database of known geographical entities; an Attribute from an enumeration of supported attributes; a Unit from an enumeration of supported units; and a data structure (such as a C struct or equivalent in another programming language) that represents a date or date range one component at a time. All of these meaning representations qualify as a question element. Another example of a natural language expression is an entire query. Such an expression will include sub-expressions that convey questions elements, as just described.

If a natural language expression (or an entire query) can be successfully interpreted by a semantic grammar 206, the expression has an associated interpretation defined by values of the output variables 214 for a rule 208. In embodiments that have a weighting module 224, as described below, each rule has an associated strength measure, and multiple interpretations may be considered in parallel, until a decision is made of which interpretation is preferred. When the natural language expression cannot be successfully interpreted by the semantic grammar, one of several strategies may be used. In one embodiment, the interpretation returns a NULL value or some other value conveying that the natural language expression could not be interpreted by the semantic grammar. In another embodiment, the failure of a semantic grammar to interpret an expression results in the failure of the attempt to complete a parallel path towards interpretation; the candidate path is simply abandoned.

An expression pattern 208A corresponds to one of the ways of describing the RHS of a context-free grammar rule 208, using BNF (Backus-Naur Form), EBNF (Extended Backus-Naur Form), a regular expression, a finite state automaton (FSA), and the like. The expression pattern 208A may be specified in terms of other semantic grammars, allowing for hierarchical relationships between semantic grammars, as well as recursive relationships, and generally the parsing of complex expressions. The programming actions 208B are used to check semantic constraints, and to assign values to the output variables 214 based on the natural language expression that the semantic rule 208 interprets.

In one embodiment, the programming language is a general-purpose procedural programming language that is extended with additional programming constructs for specifying natural language interpretation, such as the patterns 208A of the expressions to be matched. The extension of the procedural language with additional programming constructs enables the query-processing server 100 to operate in a goal-specific manner beyond the standard capabilities of a generic computer system lacking the language extension, and thereby improves its operation in the context of natural language processing systems.

In an embodiment illustrated below, a semantic grammar 206 appears as a named "block" in an extended procedural programming language based on C++, and the semantic type 204 of the semantic grammar is declared (in C++ fashion) as part of the declaration of the block. In the specific embodiment, the semantic type 204 is a C++ type declaration that lists a set of output variables 214. In other embodiments, the semantic type 204 can take other forms, such as, for example, a LISP-like property list, an association map, or a "frame" with a frame type, and "slots," some of which are required, some optional, and some have classes or frame types they must belong to. These alternative data structures, although distinct in pragmatic ways, accomplish the same function.

In another embodiment, a semantic type 204 may correspond to individual instances of, or lists of instances of, a specified class in an ontology, such as say a #Person, #Place, #Date or #CalendarEntry, possibly with some explicitly associated properties. Instances of a class are often designated by unique IDs (Person_117, Place_029, and the like) that refer implicitly both to the class hierarchy they belong in, and through some association maps, tables or databases, to known properties of these instances. The list of knowable properties for an instance is likely to be derived from its ontology class (and super-classes). Again, while pragmatic differences exist, such representations are essentially equivalent again to previously described ones, and mutually convertible with them.

In yet another embodiment, the "values" returned from a semantic grammar (or a "block" in the embodiment mentioned earlier) take the form of lists of logic expressions in the predicate calculus, or a higher order logic. One of skill in the art would be aware of additional alternative representations.

In summary, given a semantic grammar 206, its associated semantic type 204 is a way to constrain the semantic value or value(s) that may be returned as an interpretation of a natural language expression, according the given semantic grammar. In a common case, the semantic type 204 consists of a list of variables, each with a name and a programming language type.

Returning to the exemplary embodiment using a C++ extension, a grammar rule 208 may be represented by an "interpret statement" which describes the rule's pattern 208A to be matched, and standard C++ statements that define the programming actions 208B. The definition of the pattern 208A uses a C++ friendly form of EBNF; the well-known Extended Backus-Naur Form was described earlier. It is appreciated that languages other than C++ may equally be used in other embodiments; and that variant approaches exist to extending a programming language for the effective handling of semantic grammars. Such extensions provide an improvement in the technology of natural language programming by extending the programmatic capabilities of the language and making it efficient and faster for application developers to create software applications that support natural language processing.

In one embodiment, a semantic grammar 206 is written using the schema:

"block outputVariablesList blockName (pattern programmingAction)+" where "outputVariablesList" is the list of output variables 214, "blockName" is the name of the block, "pattern" is an expression pattern 208A, and "programmingAction" is an action 208B, and the expression (pattern programmingAction) stands for a rule 208. The symbol "+" is used as a meta-symbol for iteration: thus, the expression (pattern programmingAction)+ indicates that one or more rules 208 are used. A simple example of using this extended procedural programming language follows in Listing 1, below:

Listing 1

```
extern block (int totalPoints) TENNIS_POINTS( ) {
   interpret {
      (["what is" | 10 "tell me"] . ["the"] . "number of
      points played when announcer says" .
      n1=VALID_TENNIS_NUMBER( ) . ["to"] .
      n2=VALID_TENNIS_NUMBER( ))
   } as {
      totalPoints = (Points(n1->count) + Points(n2->count));
   }
}
static block (int count) VALID_TENNIS_NUMBER( ) {
   interpret {
      n_love=LOVE( ) | n=INTEGER_COUNT( )
   } as {
      if (n_love) {count = 0;}
      else {
         if ( (n->count != 15) && (n->count != 30) && (n-
         >count != 40) ) {excludethis( );}
         else {count = n->count;}
      }
   }
}
static block ( ) LOVE( ) {
interpret {
   "love"
} as { }
}
int Points(int score) {
   switch (score) {
      case 0: return 0; break;
      case 15: return 1; break;
      case 30: return 2; break;
      case 40: return 3; break;
      default: return -1;
   }
}
```

In the above example, the semantic grammar 206 named TENNIS_POINTS( ) is able to programmatically interpret an expression embodying a request to determine how many points have been played in a game based on the game score in a tennis match, with the meaning of the expression represented by output variables 214 in the parameter list (namely, the integer "totalPoints"). The expression pattern 208A (["what is" | 10 "tell me"] . ["the"] . "number of points played
when announcer says" . n1=VALID_TENNIS_NUMBER( ) . ["to"] .
n2=VALID_TENNIS_NUMBER( ))

defines a set of possible expressions that a user may input (either in text or speech) to request the current number of points so far in a tennis game. The expressions optionally begin with either the phrase "what is" or "tell me", optionally followed by the word "the", followed by the phrase "number of points played when announcer says", followed by two numbers that are valid in tennis and that are optionally separated by the word "to". Note that by constructing a more flexible expression pattern 208A for expressions in the domain of interest—one that includes a greater range of alternative forms of expression—a developer can create a more "broad spectrum" query interpretation system for users.

The numbers that are valid in tennis are in turn represented by their own semantic grammars 206 named "VALID_TENNIS_NUMBER" and which accepts the scores 15, 30, 40, or "love". Thus, the expression pattern 208A of this example semantic grammar can interpret the expression "what is the score when announcer says fifteen love" (in which case its meaning is represented by the value 1 for the totalPoints output variable), but not "what is the score when announcer says fifteen eighty" because the former expression can be successfully parsed according to the expression pattern 208A, but the latter expression cannot because "eighty" is not a valid tennis number.

Note that the semantic grammar INTEGER_COUNT( ) is not defined in Listing 1, but (for example) is provided by a separate developer and submitted to the grammar repository 201 for use by others, such as the author of the TENNIS_POINTS( ) semantic grammar of Listing 1. This feature enables different entities to provide different types of semantic grammars that can be called as needed to process higher or lower level language constructions.

Note also that the programming actions 208B may accomplish different types of purposes. For example, the programming actions 208B of the block TENNIS_POINTS( )(i.e., the code "totalPoints=(Points (n1->count)+Points (n2->count));") converts the given two scores to point values and sums them, whereas the programming actions 208B of the VALID_TENNIS_NUMBER( ) block (i.e. the code beginning with "if (n_love) {count=0;}") specifies the semantic constraint that the score be "15", "30", or "40"; if this semantic constraint is not satisfied, the excludethis( ) function will be called to abort the parse as unsuccessful.

The query-processing server 100 includes a runtime semantic parser 220 that takes a natural language query as input and determines whether a given semantic grammar 206 can interpret this query; if so, it optionally computes as well a score (a measure of strength, or likelihood) for the resulting interpretation of the query. In this case, semantic grammar 206 is a top-level semantic grammar for the entire set of recognized queries. The requirements for a semantic grammar 206 to be able to interpret a natural language expression were defined earlier; in this case, the expression is the entire query.

The semantic parser 220 operates at runtime, in response to queries. It includes the meaning parser module 222 that accepts textual input from a natural language text query or from the text transcription of a speech query, and determines whether a chosen semantic grammar 206 is able to interpret the textual input. It is understood that the task performed by meaning parser 222 is driven by a semantic grammar 206. The task involves both a process of "parsing" (in the narrow sense of analyzing and verifying the syntactic structure of the input) and a process of "interpretation," the latter including the verification of semantic constraints and the construction of a "meaning data structure." The latter structure is called the "interpretation" of the input. The runtime semantic parser 220 is often called a "parser-interpreter." In this disclosure, "parsing" according to a semantic grammar 206 will be understood (unless specified otherwise) to stand for "meaning parsing," comprising both parsing (in the sense of recognizing syntactic structure) and interpretation (in the sense of building a semantic representation). Similarly, a "parse" according to a semantic grammar 206 includes information sufficient to construct a semantic data structure (a.k.a. semantic representation, or interpretation) resulting from the entire process.

In one embodiment, the runtime semantic parser 220 includes a weighting module 224 that assigns scores to successful interpretations of an expression as a way to rank the relative strength of the successful interpretations. Specifically, the weighting module 224 computes a match strength score corresponding to a measure of strength of the interpretation obtained by a semantic grammar 206 parsing the given query, such as the estimated likelihood that the parse produces the query. The match strength measure is determined as a function of weights assigned to sub-expressions within the given expression that ultimately matches the input. In one embodiment, the weights of sub-expressions represent likelihoods of the sub-expressions, and the weight of the matching expression is calculated as the product of the weights of the sub-expressions. For instance, referring to the above code example of Listing 1, the expression pattern 208A for the TENNIS_POINTS semantic grammar is composed of sub-expressions such as "what is", "tell me", "the", "number of points when announcer says", VALID_TENNIS_NUMBER( )(a separate semantic grammar), and "to". In the disjunction for the optional sub-expression ["what is" 110 "tell me"], the value 10 serves as a weight corresponding to the sub-expression "tell me". This causes the weighting module 224 to assign a likelihood value of $1/(1+10)=1/11$ to the alternative "what is", and $10/(1+10)=10/11$ to the alternative "tell me", reflecting an expectation that a user will be 10 times as likely to say "tell me" as saying "what is" when expressing a request for a tennis score. Accordingly, expressions that are interpreted by the TENNIS_POINTS( ) semantic grammar 206 and that begin with "tell me" will obtain higher match strength (0.9090) measures than those that match but begin with "what is" (0.0909).

In some embodiments, the actions 208B of the semantic grammars 206 interpreting a given natural language expression result in generating data for output. For example, the interpretation of the expression "How much is 10 pounds in American dollars" might cause audio data representing a spoken answer to the question to be placed into one of the output variables. In another case, the response to a search for local restaurants may include a map showing the various restaurants in the answer. Thus, the output of the interpretation may include auditory data, graphical data, or the like. Alternatively, in embodiments in which portions of the application 121 are hosted on the query-processing server, those portions of the application code can receive the interpretation from the runtime semantic parser 220 and generate output based on it (e.g., auditory or graphical output data). In other embodiments, the query-handling code 122 of the applications 121 executing on the developer hosts 120 or other host receive the result of the interpretation from the query-processing server 100 and take an action, such as generating auditory or graphical output data based on the interpretation (e.g., running text to speech algorithms on textual output variables of the interpretation in order to speak an answer).

Semantic Grammar Extensibility

As noted, it is difficult for any one individual—or even any one organization—to create code capable of handling the variability and richness of expression inherent in human natural languages, even when the goal is restricted to a specific and seemingly narrow semantic category, such as (say) expressions that refer to an amount of money. No matter how broad a set of expressions was recognized by an initial MONEY( ) block, many more will be needed in the future as the range and scope of applications changes and new language expressions arise. For example, when one adds a grammar for MORTGAGE_AMOUNT( ) as part of a mortgage calculator mini-domain, it is necessary to treat a mortgage amount expression as a valid expression for a money amount. This must be done in a double-blind way: the developer of the mortgage calculator mini-domain need know nothing about the internals of MONEY( ) block. Conversely, developers of an initial MONEY( ) block have no need to consider all the possible expressions that future developers will contribute to the expression of money. The respective developers, their institutions, their source code are completely independent, and mutually hidden, except for a shared block name "MONEY( )" and its output variable types, such as a floating point number the money amount, and a currency from a published enumeration of currencies, or alternatively a single MonetaryAmount struct that has both components. The ability to extend the MONEY( ) block depends on conveying to a global (or perhaps local) administration system that a block "MonetaryAmount MONEY( )" is extensible. For MORTGAGE_AMOUNT( ) to tap into this ability, it must be conveyed that MORTGAGE_AMOUNT( ) will extend MONEY( ).

Accordingly, in one embodiment, the query-processing server 100 supports features that allow any semantic grammar 206 authored by one developer to be made extensible, so that other developers can expand upon the expressions recognized by that semantic grammar 206 by (in essence) including additional interpret blocks. That is, after a semantic grammar 206 is extended within some context (e.g., a specific code scope, such as the set of code files that are loaded together to form an application), it is in effect given additional rules 208 (patterns 208A and actions 208B). However, every rule 208 that extends a semantic grammar 206 must have the same output variables 214 as the original semantic grammar 206, so that original meanings and extended meanings will have compatible types. One can view the set of output variables 214 as a property of a sematic grammar 206, not of individual rules 208. In particular, as the original meaning representation is maintained, client code that makes use of the original semantic grammar will work without modification, even after the original semantic grammar is extended, since the original patterns 208A and actions 208B are unchanged. The extensibility of a semantic grammar 206 allows it to be treated more like a concept, for which an open-ended set of patterns 208A (and associated actions 208B) is available, rather than a fixed set of patterns chosen by the original developer. For example, the semantic grammar PERSON( ) for the concept "Person" has patterns 208A for proper names, such as FIRST_NAME( ) LAST_NAME( ) SUFFIX( ) to recognize, e.g., names such as "John Smith Jr." It is useful to extend the set of natural language expressions that refer to entities of "type" Person, or instances of the "concept" of a Person and to this effect, they may be seen as extensions of the PERSON( ) semantic grammar 206. For example, one may develop natural language expressions for family relationships, including a semantic grammar RELATIVE( ) whose rule patterns 208A include, say, {PERSON( ) s brother} and {the brother of PERSON( )}. Note the use of curly braces to delimit a pattern 208A; the braces are meta-symbols that are not part of the pattern. Lower case words are "literal" and are indeed taken literally. An upper-case word followed by parentheses( ) corresponds to a "non-terminal" in classic texts on context-free grammars; but there are sufficient differences (including the presence of semantics) to justify a different notation.

The first of the two patterns above recognizes "John's brother" and both patterns have equivalent actions 208B that give the same interpretation 214. Both are "Persons" and the semantic grammar RELATIVE( ) should extend semantic grammar PERSON( ) The PERSON( ) semantic grammar (aimed at capturing natural language expressions for the "Person" concept) may be extended further to include, say, persons from the Politics domain ("the ninth president of the United States") as well as, say, persons from the Music domain, to handle expressions such as "the lead singer of The Police". The corresponding semantic grammars 206 may be used in combination to recognize (i.e., parse and interpret) complex expressions such as "the name of the mother of the lead singer of The Police". The latter expression requires patterns 208A for the name of PERSON( ) as well as the mother of PERSON( ) and the lead singer of MUSIC_BAND( ) plus knowing that the last two patterns 208A have interpretations that are of the same type as any PERSON( ).

Note that semantic grammars for PERSON( ) RELATIVE( ) MUSIC_PERSON( ) and MUSIC_BAND( ) can be developed independently and modularly, as well as incrementally over time, by people and organizations that know little to nothing about each other's existence, properties, or knowledge representations, including grammars, domains and language patterns. For example, a second developer working independently of a first developer (e.g., working for a different organization, or at the same organization but without knowledge of a first semantic grammar beyond its interface) can create a second semantic grammar and specify that it extends the first semantic grammar. The ability to expand the capabilities of natural language recognizers in this deeply decoupled manner has the potential to significantly improve the technology of natural language processing.

In one embodiment, after extending a first semantic grammar by a second semantic grammar, the resulting extended semantic grammar acts as if it included the union of the patterns 208A (and corresponding actions 208B) from the first semantic grammar and from the second semantic grammar. In one embodiment, to avoid redundancy entailed by duplicate patterns in the union, the query-processing server 100 identifies and eliminates duplicate patterns. In other embodiments, it is left to the developer to avoid introducing duplicate patterns.

A first semantic grammar, created by a first developer from a first institution, may be extended by a semantic grammar created by a second developer from a second institution; the second developer may or may not be the same as the first developer, and the second institution may or may not be the same as the first institution. After the first semantic grammar is extended by the second semantic grammar, the behavior of the entire system is effectively that of a merged recognizer that recognizes the union of the patterns 208A (and actions 208B) from both the first and second semantic grammars. The query-processing server 100 includes a grammar extension module 209 that implements the extension of one semantic grammar by another by creating data specifying interpretation according to the union of the patterns. The implementation of extension can take different forms in different embodiments, based on the particular way that the query-processing server performs interpretation, such as compilation, interpretation, etc. In an embodiment of the extension based on interpreting the union of the two grammars, the effect of the extension may be experienced immediately by the users of the system. In an embodiment of the extension based on linking recognizers for the first and second grammars, the extension takes effect after a linking phase is applied. In an embodiment of the extension based on compiling recognizers for the union grammar, the extension takes effect after the joint compilation; in some of these embodiments, an extensive joint optimization may take place. In some embodiments, a release process is used to control switching the behavior of the system over to the extended behavior. In an embodiment based on the use of DLL's, described elsewhere, grammar extension can be performed without a recompilation of the pre-exiting system, thus avoiding the release of a new version of the query processing server software.

In such embodiments, the metadata 207 for semantic grammars 206 tells whether a semantic grammar is extensible, and optionally if it is shared or visible. The visibility attribute (if present) determines whether developers other than those who created the particular semantic grammar 206 are allowed to see the code for the augmented grammar rules 208 for that semantic grammar. The shared attribute (if present) determines whether developers other than those who created the particular semantic grammar 206 are permitted to use of the semantic grammar by referencing it (invoking it) as in their own semantic rules 208. (In one embodiment, by default, semantic grammars 206 lack code visibility, but are shared.) The extensibility attribute for a semantic grammar 206 determines whether other code is permitted to "extend" that semantic grammar. Making a semantic grammar A extensible allows the expansion of the set of patterns 208A that semantic grammar A can recognize, however, this is achieved without modifying the original definition of grammar A as given by its developer. If semantic grammar A is extensible, other developers can expand its functionality, even when the code of semantic grammar A is not visible to the other developers (e.g., because the developers of the original semantic grammar do not wish other developers to find out exactly how it was implemented). The syntax for declaring extensibility may vary in different embodiments. Examples are: using the keyword "extensible" in a declaration such as "extensible block (MonetaryValue m) MONEY( )") or a adding a code attribute (e.g., "[extensible=true]") in the definition of the block, or elsewhere. The extensibility of a semantic grammar is typically stored as part of its metadata.

When a semantic grammar 206 is extended, weights may be applied to the new "extended" portion of the patterns 208A, relative to the original patterns. This allows the original meaning and the "extended" meaning to receive a specified degree of emphasis desired by the developer who wishes for the extension.

As one specific, concrete example, assume that a semantic grammar 206 with the symbol name MONEY( ) has an output variable 214 that describes a monetary type (e.g., a data structure called MonetaryAmount comprising a numeric monetary amount, and an identifier of a currency for the monetary amount) and that it can interpret expressions consisting of a numeric value followed by a currency, such as "100 dollars", "50 euros", "2000 Japanese yen", and the like. Virtual assistant software for interpreting and answering a user's questions would use the semantic grammar 206 for interpreting monetary amounts, allowing it to respond to questions such as "What was the inflation-adjusted value of 100 dollars in 1950?", perhaps through the use of patterns that include {what was VALUE( ) in YEAR( )} and {the inflation-adjusted value of MONEY( )}.

Given the literal nature of what the semantic grammar MONEY( ) can recognize (a numeric value followed by a currency identifier), the virtual assistant will not be able to respond to more casually-phrased questions having slang references to money, such as "What was the inflation-adjusted value of a fiver in 1950?" (where a "fiver" is slang for 5 British pounds). To handle more flexible queries containing both literal monetary values and slang equivalents thereof, a developer creating the virtual assistant would be obliged to alter the question pattern code, such as to { . . . value of [MONEY( )|SLANG_MONEY( )] in YEAR( )}, after defining the semantic grammar SLANG_MONEY( ) However, the revision of client code is undesirable, since it may entail frequent and/or wide-spread revisions as the constituent semantic grammars 206 are revised. Centralization of revisions within an extension, rather than separate revisions to client code, is a more readily-comprehensible approach, and one that is easier to add to a shared library available to all should the extension prove over time to be of value to many developers.

Instead of the developer being obliged to revise the client code, the semantic grammar extensibility features enable the developer to augment the patterns 208A and actions 208B of the semantic grammar MONEY( ) itself, without changing any of the client code. This capability enables the developer to continue to use the original question patterns without alteration, while still enabling the virtual assistant application to process a broader range of expressions (e.g., both literal and slang expressions of money). At the same time, other developers who used the semantic grammar MONEY( ) in its original sense would not be affected by the change, since MONEY( ) would only be extended within a limited scope defined by the developers who wish it to be extended.

Continuing this example, since the metadata 207 of semantic grammar MONEY( ) indicates that the grammar is extensible, the grammar of MONEY( ) can be modified to process additional expressions. For example, a semantic grammar SLANG_MONEY( ) that interpreted expressions such as "quid", "Benjamin", "C-note", etc. as values of type MonetaryValue (e.g., interpreting "fiver" as the structure <5, "pounds">, or "Benjamin" as the structure <100, "dollars">) may be added as an extension to the semantic grammar of MONEY( ) within a particular context, the meaning of the semantic grammar MONEY( ) is to be extended to include not only its original meaning, but also the meaning defined by the semantic grammar SLANG_MONEY( ) thus allowing MONEY( ) to recognize both the expressions "100 dollars" and "Benjamin".

For example, a SLANG_MONEY( ) semantic grammar follows in Listing 2, using the same extended procedural programming language as given above in the example of Listing 1:

Listing 2

```
extern block (MonetaryValue m) SLANG_MONEY( ) {
  interpret {"fiver"} as {new MonetaryValue(5, "pounds")};
  interpret {"benjamin"} as {new MonetaryValue(100,
    "dollars")};
  interpret {"C-note"} as {new MonetaryValue(100,
    "dollars")};
}
```

Given this definition of the semantic grammar SLANG_MONEY( ) which has the same output variable type (i.e., "MonetaryValue") as the semantic grammar MONEY( ) MONEY( ) can be extended to include the meaning of SLANG_MONEY( ) e.g., using a directive, such as:

extends MONEY ( ) SLANG_MONEY ( )

which (in a typical embodiment) causes the "extends" relationship to be stored as part of the metadata associated with the block SLANG_MONEY ( ) and/or the block MONEY. In another embodiment, the "extends" relation among semantic grammars is stored as part of a global data structure. As a result of the extension, any reference to MONEY( ) within lexical units (such as code files, or classes) where the extension takes effect will include in MONEY( ) the phrasings and meanings from SLANG_MONEY( ) whether or not the code of MONEY( ) visible, hence not expected to be directly modifiable. This can be stated more broadly. If a semantic grammar A is extended by a semantic grammar B, all invocations of A in the original form will be treated as invocations of A in the extended form. There is another embodiment, discussed elsewhere, for which the choice between A in the original form, called "inner A," and A in the extended form, called "outer A," can be made as a function of context.

Weights may also be specified for the extension. For example, in one embodiment the "#extends" directive may have the form "#extends <weight> A, B", where weight is a numerical value by which the weights already assigned to the patterns in semantic grammar B are multiplied; if <weight> is not specified, it defaults to 1.0. For instance, the directive "#extends 2 MONEY, SLANG_MONEY" means that the patterns for SLANG_MONEY( )(i.e., "fiver" and "C-note" will have their weights multiplied by a factor of 2, while the weights for MONEY( ) patterns will remain unchanged, thereby making the patterns of SLANG_MONEY( ) relatively more important in the extension. That is, of the total weight for the extended semantic grammar, ⅔ of the weight will go to SLANG_MONEY( ) and ⅓ to MONEY( ) each will then distribute that portion of the total weight to its patterns according to the pattern weights. E.g., if "fiver", "benjamin", and "C-note" from Listing 2 were assigned weights of 2, 1, and 1, respectively, then the weight of 2 in the #extends directive would cause SLANG_MONEY( ) to receive ⅔ of the total weight, of which "fiver" would receive ¾, i.e., ⅔ *¾=⅓ of the total weight for the patterns of the extended semantic grammar.

Implementation of Extensibility

In sum, the basic elements of, or conditions for, the extensibility mechanism are (1) permission for block extensibility, (2) equivalence of output variables, (3) extension invocation, and (4) scope of the extension invocation.

In one embodiment, condition (1) is met when the metadata for a given semantic grammar 206 contains an indication that the semantic grammar is extensible (i.e., may be extended). In some embodiments, all semantic grammars 206 are extensible by default, as long as their metadata indicates that they are shareable.

Regarding condition (2), the output variables for (i) the semantic grammar 206 to be extended, and (ii) the semantic grammar (or literal expression) that extends it, must be pairwise compatible. This property means that the semantic grammar 206, as extended, will continue to have the same meaning after extension, which permits calling code that uses the semantic grammar 206 to continue to function in a similar way, without modification. In one embodiment, the query-processing server 100 flags as an error an attempt to extend a semantic grammar 206 with something (e.g., another semantic grammar, or a literal expression) having different output variables. For an embodiment in which the query-processing server pre-compiles the semantic grammars 206 into equivalent code for another language (e.g., C++) or into binary, these flags would be used at compile time.

Specifically, for the output variables of two semantic grammars to be considered pairwise compatible, the two grammars must have the same number of variables, and the corresponding pairs of variables must either have literally the same type, or types that are convertible in the manner explained below. In one embodiment, corresponding pairs are determined by position (i.e., the order of the variables). In another embodiment, corresponding pairs are determined by matching the names given to the variables. Considering a corresponding pair of variables, their types are considered convertible if the type of an output variable of the semantic grammar that extends the first semantic grammar can be legally cast to the type of the corresponding output variable of the first semantic grammar. For example, assume we are matching variables by position. If a first semantic grammar, A, is extended by a second semantic grammar, B, and A has output variables "int v1, string v2, float v3", B's output variables are literally equal if its three output types are "int", "string", and "float" in this order. But they are not equivalent if B has fewer or more than three output variables, or if the three types are (for example) "string", "string", and "float"—due to the fact that the types of the first variable ("int" for A and "string" for B) don't match. However, convertibility occurs when the type of a variable in the extending grammar can legally be cast to the type of the corresponding variable in the extended grammar. For example, a "float" variable type in grammar A can be extended by an "int" variable type in grammar B. Many other examples of legal casts exist; they include the case where a variable in A has a class type C, and the type of the corresponding variable in B is a sub-class of C.

In one embodiment, when the query-processing server 100 encounters an extension of a semantic grammar A by a semantic grammar B, it verifies that the output variables of A and B are equivalent. If they are not equivalent, then the grammar-merging module 209 will not merge semantic grammar B into semantic grammar A.

There are several possible implementations for the creation of the merged grammar resulting from extending a semantic grammar A by semantic grammar B. The interpreter-based embodiment 270 has the least amount of work to do at the time of declaring the extension, but it is slowest at runtime. Note that the term "interpreter" in the current context is used in a different way than in the rest of the disclosure. Here, semantic grammars are interpreted from their source form in the semantic grammar repository 201, and this happens for every query, making runtime slow; using an "interpreter" of the semantic grammars is in contrast with the idea of "compiling grammars;" the latter can be much more efficient.

The interpreter-based method 270 is quite fast at grammar extension time: when a developer supplies a new semantic grammar B, the source for grammar B is simply added to the semantic grammar repository 201. When the same developer, or perhaps another authorized third party, later requests the extension of A by B, it is sufficient to implement the extension to add to the repository a single rule 208 to the list of rules for semantic grammar A. This rule takes the syntactic form A::=B in BNF, indicating that an expression that B can parse can next be parsed by A. The semantic action corresponding to this new rule involves casting the result from B (the interpretation according to B, which has B's semantic type) to the semantic type of A. The exact way to carry out casting depends on the types involved; this is discussed elsewhere in the disclosure. Let us illustrate the most common case, in the exemplary extended language. Suppose that we have forward declarations for the A block, A BLOCK( ) and the B block, B BLOCK( ) as shown below. Then we can write the following code to implement in A BLOCK( ) the extension of A by B:

Listing 3

```
// forward declarations
extern block (float x1, float x2, int x3) A_BLOCK( );
extern block (int b1, double b2, int b3) B_BLOCK( ); // forward
declaration
// code for the extension of A by B
extern block (float x1, float x2, int ) A_BLOCK( ) {
    // keep all the previous interpret statements for A_BLOCK( ), and add
    this one:
    interpret { bResult = B( ) ) } as {
        x1 = bResult->b1;
        x2 = bResult->b2;
        x3 = bResult->b3;
    }
}
```

The code in the example above performs a cast from (int b1, double b2, int b3) to (float x1, float x2, int x3), which decomposes into three pairwise casts—although the third one is a pairwise assignment that does not require a cast. But two casts are required, float x1 is upcast from an int, but float x2 is downcast from a double.

A variant of the interpreter-based method is to use a language such as Prolog II to support backtracking in parsing and interpretation.

Embodiments other than the interpreter-based method 270 (the loader 272, linker 274, compiler 276 and grammar optimizer 278) fully ignore semantic grammar repository 201 at runtime. To process queries, runtime semantic parser 220 uses instead numerous fragments of object code 252, stored in the semantic grammar object code repository 250. These fragments are created from semantic grammar repository 201 at compilation time, as shown by the thick black arrow from left to right (grammar repository 201 to object code repository 250.)

Another embodiment is based on a loader 272. Here, a merged semantic grammar based on semantic grammars A and B may be obtained if semantic grammars are implemented by dynamically loaded libraries (DLL's). This approach is well suited, for example, to the use of a top-down semantic parser, in which parsing is done by calling compiled procedures that parse inputs and return interpretations to implement semantic grammars. One way to do this is that the function that implements an extensible grammar has an "outer shell" that calls, in turn, the original grammar (A) and subsequent grammars that extend it (B1, B2, . . . ). These grammars B1, B2, . . . are dynamically loaded (after compilation to DLL's) when declared as extensions of A. Calls "from the outside" to an extensible semantic grammar 206 are implemented as calls to the "outer shell" procedure, which invokes in turn the inner procedure for A, then procedures for the extending grammars. These invocations may also be performed in parallel, instead of sequentially, especially if one assumes a suitable thread management system.

Another embodiment of the grammar merging technique is based on using a linker. This can be extremely similar to the DLL implementation; but the implementation uses static loading, which is somewhat less flexible in terms of the latency required after a new grammar extension has been declared. In exchange, the "outer shell" procedure used for an extensible function can be more efficient, and in fact, the outer/inner distinction only needs to exist when an extensible grammar A is actually being extended by a grammar B.

Another embodiment is the compiler-based technique 276. In this case, the source representation for grammars (from the semantic grammar repository 201) is available simultaneously for grammar A and grammar B. In order to implement the extension, the situation is the same as was discussed in the context of the interpreter-based embodiment: it is possible to add a single rule (A::=B) to grammar A, and this rule casts the interpretation of B into that of A, using their respective sematic types. The corresponding code from our exemplary embodiment is already provided in Listing 3. After adding to semantic grammar A the single rule just described, or in the exemplary programming language embodiment, the corresponding code from Listing 3, the compilation of semantic grammar repository 201 can proceed as usual. To save compilation time, it is possible to keep track of grammar source blocks that do not need to be recompiled, although this may depend on the degree of cross-grammar optimization.

In fact, there is a substantial opportunity for optimization when the source code for all grammars is present in semantic grammar repository 201. Using a cross-grammar optimizer embodiment 278 is essentially a special case of the compiler embodiment 276, but one in which deep optimization is carried out in conjunction with recompiling with newly merged grammars. Various techniques are known in the field for optimizing the implementation of grammars, such as mapping grammars to state machines (FSA, NFA, PDAs) followed by the use of optimization algorithms. Developing this aspect of the compiler can lead to substantial speed improvements at runtime, at the cost of some compilation time; the tradeoff favors optimization, if a large number of queries needs to be processed.

In a variant embodiment of extension, a semantic grammar A may be extended by a semantic grammar B conditionally, or in a limited context, rather than unconditionally or globally. In such cases, the context is defined by certain parameters, which may be static or dynamic. As a first example, the context may involve a partial knowledge of the identity of the application receiving a query. This allows applications to define for themselves whether they wish to use an original or an extended version of semantic grammar A. In other examples, the knowledge of the geographic location of the client device from where the query originates (e.g., a GPS coordinate, or a location inferred from an IP address), or at least a time zone for the client, or the day or time that the query was received, will allow the system to tailor the results to a particular locale and/or time. Also relevant may be the set of applications and other resources owned by the submitter of the query. An extension might be used if the user has subscribed a particular domain, allowing the set of interpretable expressions to be expanded appropriately for that domain.

Condition (3) is realized when there is an indication that a semantic grammar B (or literal code returning a result matching semantic grammar A's output variables) extends a semantic grammar A. This may be accomplished in different ways in different embodiments. For example, in one embodiment, it could be expressed with the statement directive "#extends A, B" (in a scope in which A and B are already defined), or "extension block A {B( )}" (where B( )

denotes the patterns 208A and actions 208B to be added to A). In one embodiment, such statements of extension of a semantic grammar 206 can also be placed within another file and included into each file of code that wishes to use the extended form of a semantic grammar, e.g., via an "#include" directive or equivalent thereof. It is appreciated that any number of different formulations could be employed for this purpose.

Condition (4) indicates the scope of code for which the extension of a semantic grammar 206 will be effective; outside of that scope, the original meaning of the semantic grammar will apply. In one embodiment, the extension applies to the entire file of code in which it occurs; in other embodiments, the scope of an extension may be limited to a particular lexical unit different from a file as a whole (e.g., a class or function).

In one embodiment, for each extension of a semantic grammar 206, the query-processing server 100 generates an extended version of the semantic grammar by starting with a plain copy of the original semantic grammar, with the addition of the rules 208 (patterns 208A and actions 208B) from the extension, giving it a separate identifier from the original, and causing any reference to the original semantic grammar within the scope of the extension to refer to the new, separate identifier. In another embodiment, all of the sets of extensions of each semantic grammar 206 are known to the query-processing server 100 when the query-processing server compiles the semantic grammars, and are individually optimized. In another embodiment, the execution of a semantic grammar 206 invokes both the original semantic grammar 206 and successively any available extensions in the scope. The order is not important, since all parses are pursued in parallel, but the weights must be computed correctly, according to the rules described earlier. This involves proper scaling due to normalization. In this way, each semantic grammar 206 can be compiled and optimized separately, but the combinations via extensions are assembled flexibly. In another embodiment, interpretation, rather than compilation, is used.

Interpretation of Sample Queries Using Extension

FIGS. 3A-3E provide specific examples of the interpretation of successively more complex queries, and of the use of semantic grammar extension as a technique for dealing with the increased complexity.

Figure 3A:
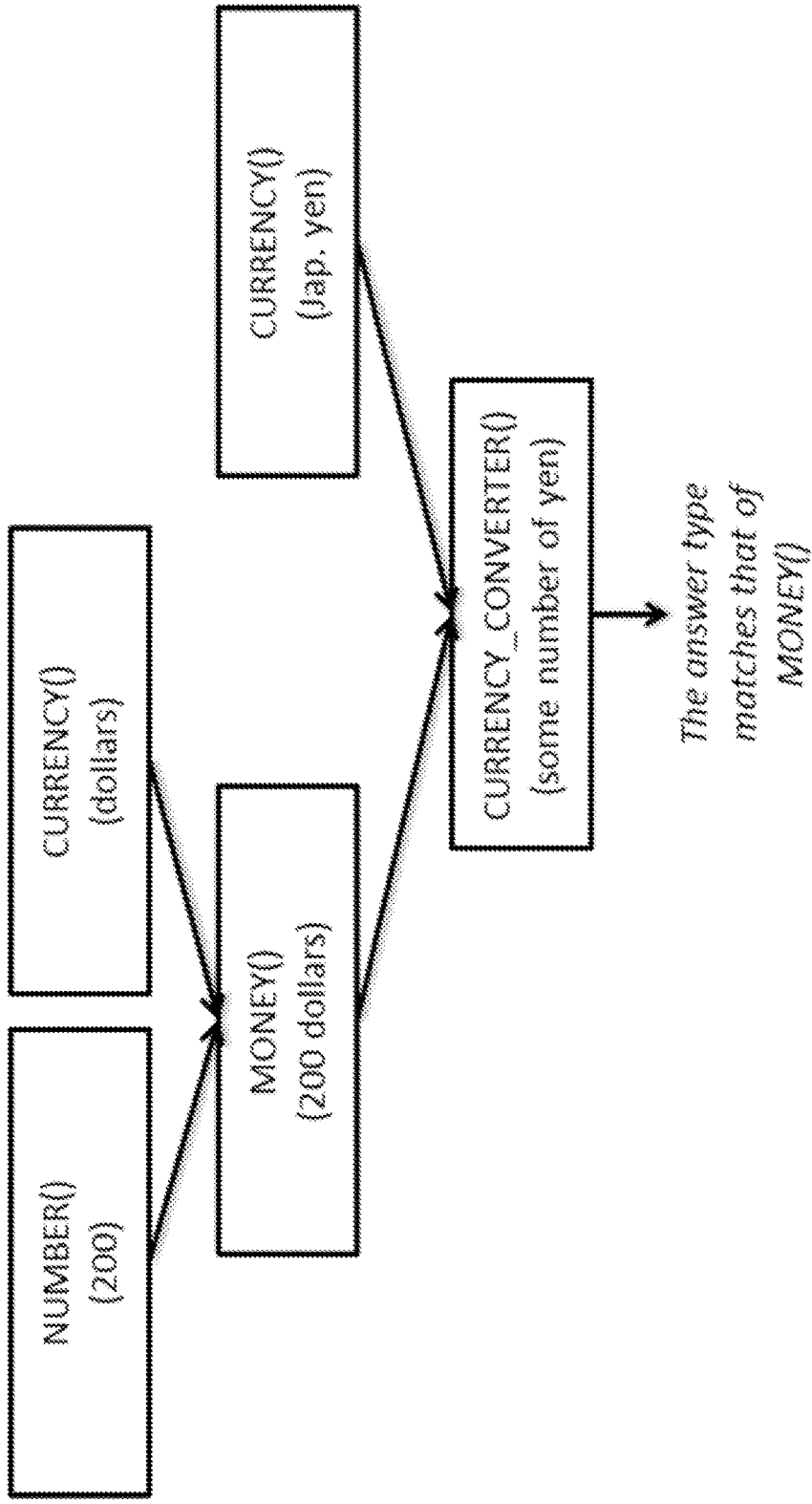
FIGS. 3A-3E provide specific examples of the interpretation of successively more complex queries, and of the use of semantic grammar extension as a technique for dealing with the increased complexity.

FIG. 3A illustrates virtual assistant software that can (among other things) interpret and respond to a query using the CURRENCY_CONVERTER( ) semantic grammar. The latter grammar can interpret expressions of the form {WHAT_IS( ) MONEY( ) in CURRENCY( )}, such as "what is 200 dollars in Japanese yen", where "what is" is recognized by the (usually redundant) prefix WHAT_IS( ) "200 dollars" is parsed by semantic grammar MONEY( ) and "Japanese yen" is parsed by semantic grammar CURRENCY( ) CURRENCY_CONVERTER( ) itself thus parses and interprets the phrase "200 dollars in Japanese yen".

Figure 3B:
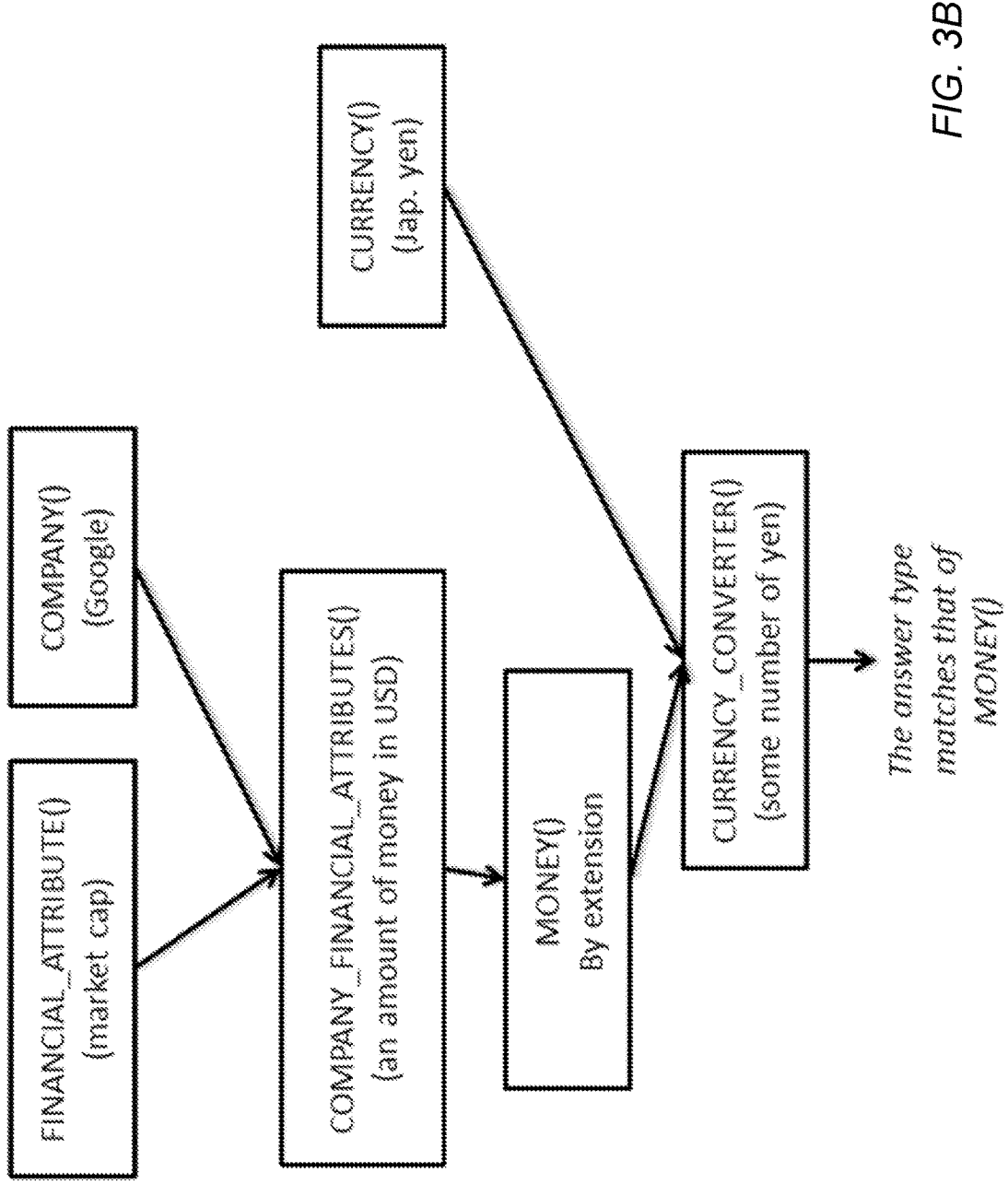

FIG. 3B an extension of the power of the virtual assistant software through extension of the MONEY( ) semantic grammar. Specifically, MONEY( ) has been extended to interpret—in addition to the expression NUMBER( ). CURRENCY( ) that it was originally defined to recognize—the expressions interpreted by the semantic grammar COMPANY_FINANCIAL_ATTRIBUTES( )(i.e., expressions of the form FINANCIAL_ATTRIBUTE( ) COMPANY( ). Thus, NUMBER( ) as extended can recognize not only literal monetary expressions such as "200 dollars", but also indirect references to monetary values, such as "the market cap of Google". Accordingly, after the extension of the definition of MONEY( )(e.g., within the lexical scope of the code implementing the virtual assistant software), the same virtual assistant can interpret more complex expressions.

Figure 3C:
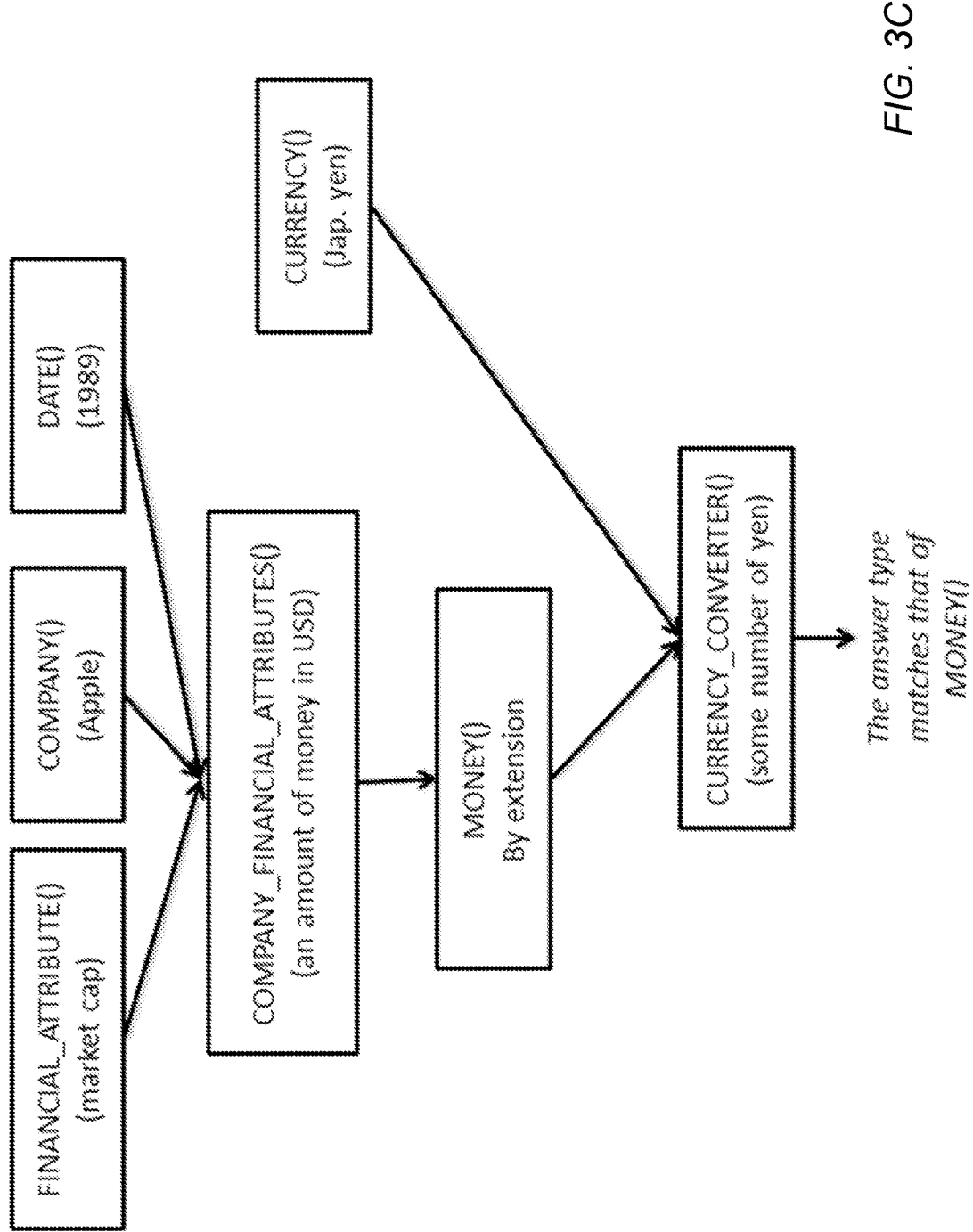

FIG. 3C illustrates another extension of a semantic grammar: namely, the extension of COMPANY_FINANCIAL_ATTRIBUTES( ) After the extension, COMPANY_FINANCIAL_ATTRIBUTES( ) can interpret not only its original expressions (namely, {FINANCIAL_ATTRIBUTE( ) COMPANY( )}, such as "the market cap of Apple"), but also the original expressions as qualified by a date (e.g., "the market cap of Apple in 1989").

Figure 3D:
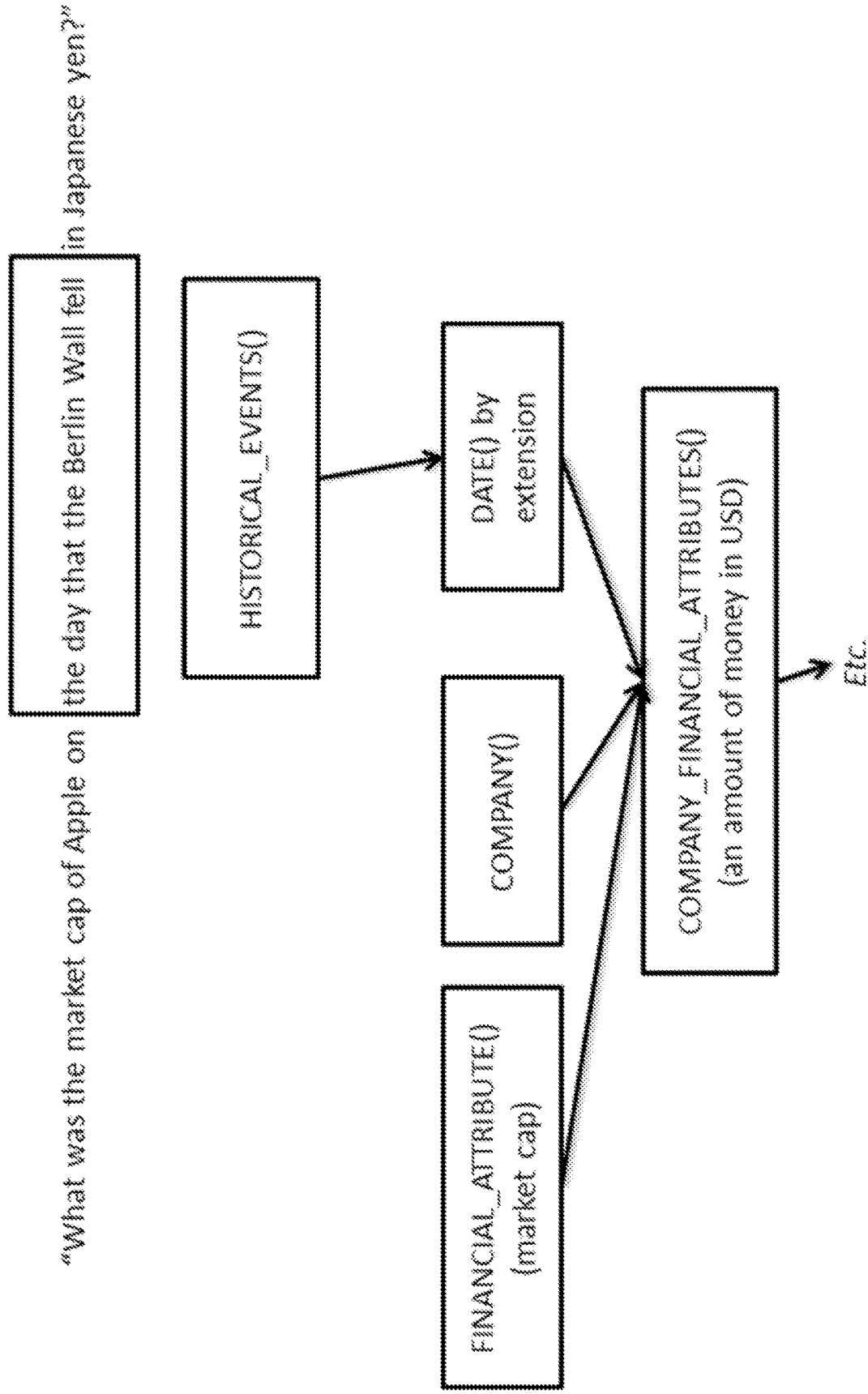

FIG. 3D illustrates the extension of the DATE( ) semantic grammar to interpret not only literal dates (such as the year "1989"), but also indirect references to a particular date defined by a historical event (such as "the day that the Berlin Wall fell").

Figure 3E:
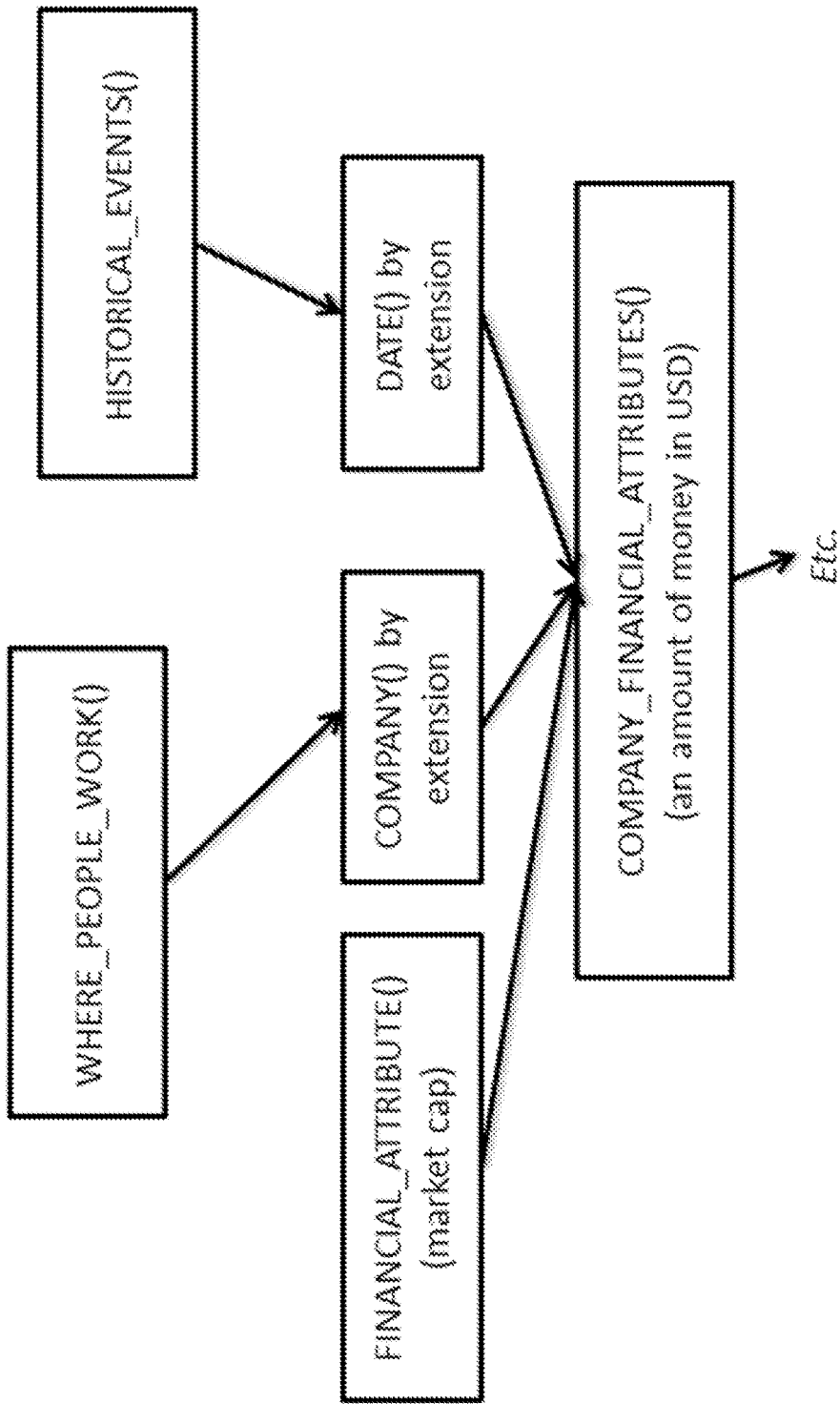

Finally, FIG. 3E illustrates the extension of the COMPANY( ) semantic grammar to interpret not only literal company names (such as "Apple"), but also indirect references to a particular company (such as "the place that Steve Jobs worked").

Thus, in the example of FIGS. 3A-3E, the extension of the MONEY( ) COMPANY_FINANCIAL_ATTRIBUTES®, DATE( ) and COMPANY( ) semantic grammars permits the original expression recognized by the virtual assistant software (namely, {what ["was"|"is"] COMPANY_FINANCIAL_ATTRIBUTES( )}) to interpret a vastly more complicated universe of user expressions, moving beyond questions referring to a few literals (e.g., "What is 200 dollars in Japanese yen?") to extremely complex questions indirectly referencing concepts (e.g., "What was the market cap of the place that Steve Jobs worked on the day that the Berlin Wall fell in Japanese yen?").

Example Computer Architecture

Figure 4:
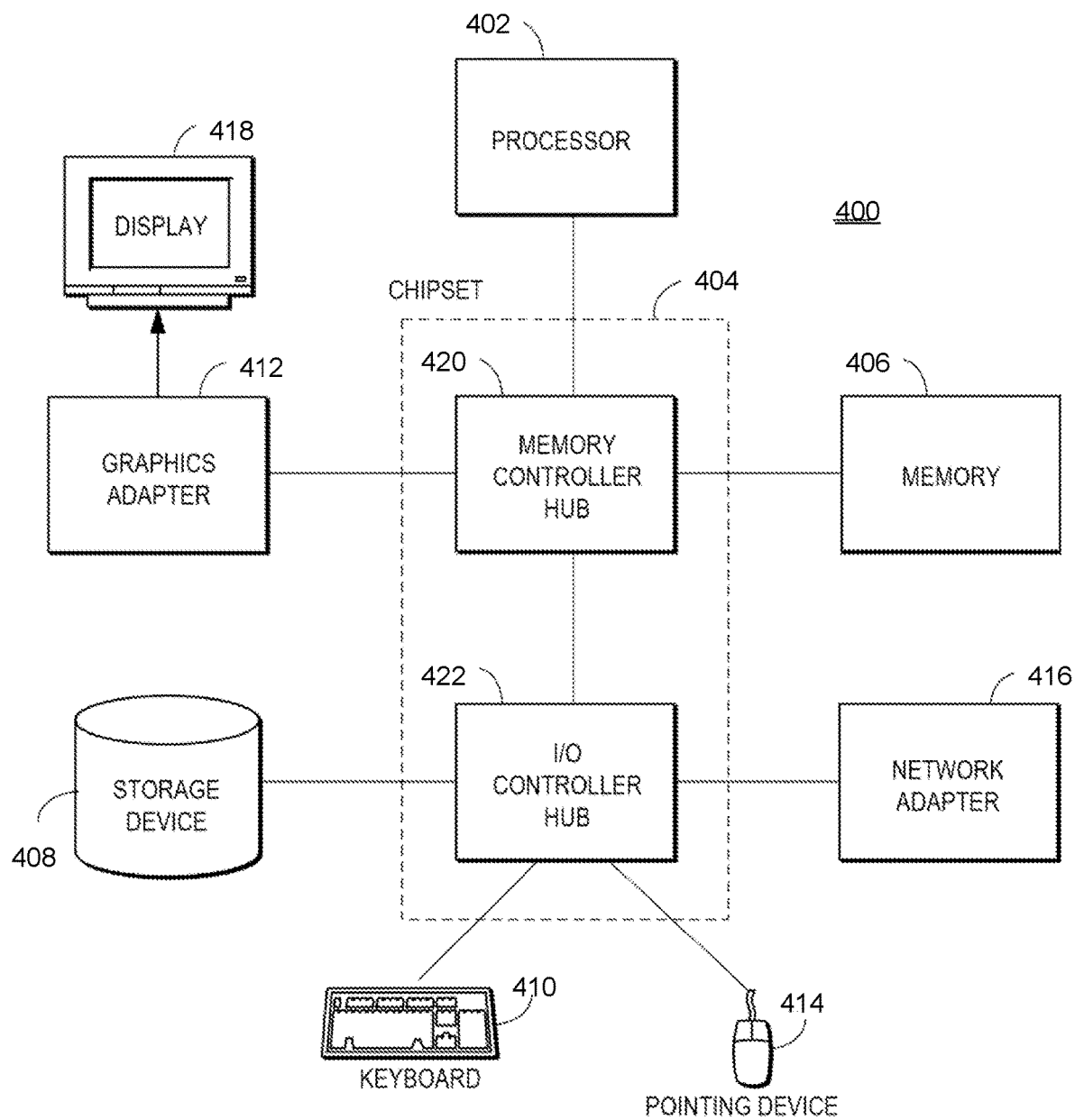
FIG. 4 is a high-level block diagram illustrating physical components of a computer used as part or all of the query-processing server or client device or developer host systems of FIG. 1, according to one embodiment.

FIG. 4 is a high-level block diagram illustrating physical components of a computer 400 used as part or all of the query-processing server 100 or client device 110, or developer host 120 from FIG. 1, according to one embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment. The indefinite article "a" and "an" should be understood to include both the singular and the plural as appropriate for the context; thus "a block" should be understood for example to mean "at least one block".

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

What is claimed is:

1. A computer-implemented method comprising:
   for a first semantic grammar and a second semantic grammar, both having a semantic type and a grammar pattern:
   responsive to an indication that the second semantic grammar extends the first semantic grammar:
   creating a merged semantic grammar that interprets a natural language expression based on a combination of the first semantic grammar and the second semantic grammar,
   wherein an invocation of the first semantic grammar invokes the merged semantic grammar;
   receiving a natural language expression; and
   interpreting the natural language expression using the merged semantic grammar.

2. The computer-implemented method of claim 1, further comprising:
   based on the interpretation, generating output comprising at least one of a graphical output and an auditory output.

3. The computer-implemented method of claim 1, wherein interpreting the natural language expression comprises:
   responsive to the expression having a second interpretation according to the second grammar, deriving an interpretation of the expression according to the merged semantic grammar from the second interpretation by first casting values from the second semantic type to the merged semantic type.

4. The computer-implemented method of claim 1, wherein creating the merged grammar comprises linking static code libraries for the first semantic grammar and the second semantic grammar.

5. The computer-implemented method of claim 1, wherein creating the merged grammar comprises jointly compiling the first semantic grammar and the second semantic grammar.

6. The computer-implemented method of claim 1, wherein creating the merged grammar comprises jointly optimizing the combination of the first semantic grammar and the second semantic grammar.

7. The computer-implemented method of claim 1, wherein creating the merged grammar comprises dynamically loading a code library for the second semantic grammar.

8. The computer-implemented method of claim 1, wherein creating the merged grammar adds a rule to the first semantic grammar.

9. The computer-implemented method of claim 1, wherein: the first semantic grammar is received from a first developer; and the second semantic grammar is received from a second developer.

10. The computer-implemented method of claim 1, wherein at least one of the first semantic grammar and the second semantic grammar includes a weight for a sub-expression, the interpreting the natural language expression further comprising selecting an interpretation using the weight.

11. The computer-implemented method of claim 1, wherein the second semantic grammar extends the first semantic grammar within a first context but not within a second context.

12. The computer-implemented method of claim 1, wherein the second semantic grammar extends the first semantic grammar only within a lexical sub-unit of a file of code in which the indication that the second semantic grammar extends the first semantic grammar occurs.

13. A computer system comprising: a computer processor; and a non-transitory computer-readable storage medium storing instructions that when executed by the computer processor perform actions comprising: for a first semantic grammar and a second semantic grammar, both having a semantic type and a grammar pattern: responsive to an indication that the second semantic grammar extends the first semantic grammar: creating a merged semantic grammar that interprets a natural language expression based on a combination of the first semantic grammar and the second semantic grammar, wherein an invocation of the first semantic grammar invokes the merged semantic grammar, the actions further comprising: receiving a natural language expression; interpreting the natural language expression using the merged semantic grammar; and based on the interpretation, generating output comprising at least one of a graphical output and an auditory output.

14. The computer system of claim 13, wherein: the first semantic grammar is received from a first developer; and the second semantic grammar is received from a second developer.

15. The computer system of claim 13, wherein at least one of the first semantic grammar and the second semantic grammar includes a weight for a sub-expression, the interpreting the natural language expression further comprising selecting an interpretation using the weight.

16. The computer system of claim 13, wherein the second semantic grammar extends the first semantic grammar within a first context but not within a second contest.

17. The computer system of claim 13, wherein the second semantic grammar extends the first semantic grammar only within a lexical sub-unit of a file of code in which the indication that the second semantic grammar extends the first semantic grammar occurs.

18. A non-transitory computer-readable storage medium storing instructions that when executed by a computer processor performs actions comprising: for a first semantic grammar and a second semantic grammar, both having a semantic type and a grammar pattern: responsive to an indication that the second semantic grammar extends the first semantic grammar: creating a merged semantic grammar that interprets a naturel language expression based on a combination of the first semantic grammar and the second semantic grammar, wherein an invocation of the first semantic grammar invokes the merged semantic grammar; and further comprising the actions of receiving a natural language expression; and interpreting the natural language expression using the merged semantic grammar.

\* \* \* \* \*